United States Patent
Makino et al.

(10) Patent No.: US 6,797,205 B2
(45) Date of Patent: Sep. 28, 2004

(54) PROCESS FOR PRODUCTION OF CERAMIC STRUCTURE

(75) Inventors: Kyoko Makino, Nagoya (JP); Yasushi Noguchi, Nagoya (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 10/203,784

(22) PCT Filed: Feb. 9, 2001

(86) PCT No.: PCT/JP01/00924

§ 371 (c)(1),
(2), (4) Date: Aug. 14, 2002

(87) PCT Pub. No.: WO01/60574

PCT Pub. Date: Aug. 23, 2001

(65) Prior Publication Data

US 2003/0034586 A1 Feb. 20, 2003

(30) Foreign Application Priority Data

Feb. 18, 2000 (JP) ........................................ 2000-040690

(51) Int. Cl.[7] .................................................. B28B 3/20
(52) U.S. Cl. ...................... 264/40.1; 264/319; 264/638
(58) Field of Search ................................ 264/40.1, 638, 264/319

(56) References Cited

U.S. PATENT DOCUMENTS 6,117,377 A * 9/2000 Makino et al. ......... 264/177.11
2003/0146538 A1 * 8/2003 Sambrook et al. .......... 264/211

FOREIGN PATENT DOCUMENTS

| EP | 0 165 651 A2 | 12/1985 |
| EP | 0 380 563 A2 | 3/1990 |
| EP | 0 897 899 A1 | 2/1999 |

OTHER PUBLICATIONS

Youichi Motoki, "Ceramic Seizou Process I," Oct. 10, 1978, pp. 97–98, No Translation.

* cited by examiner

*Primary Examiner*—Christopher A. Fiorilla
(74) *Attorney, Agent, or Firm*—Parkhurst & Wendel, L.L.P.

(57) ABSTRACT

A process for producing a ceramic structure, which comprises adding an organic assistant to a ceramic raw material mixture, kneading them to obtain a readily formable bullet, and extruding the readily formable bullet to obtain a ceramic structure, wherein the organic assistant is composed mainly of an organic compound giving a haze of 10 to 90% when made into a 5 weight % aqueous dispersion. According to the process, the load to the extruder is small and a ceramic structure can be produced at high shapability and a high productivity.

3 Claims, 1 Drawing Sheet

PROCESS FOR PRODUCTION OF CERAMIC STRUCTURE

This application is a 371 of PCT/JP01/00924 filed Feb. 9, 2001.

TECHNICAL FIELD

The present invention relates to a process for producing a ceramic structure, particularly to a process for producing a ceramic structure, which is suitable for production of a honeycomb ceramic structure using a continuous extruder.

BACKGROUND ART

For production of a ceramic structure, there has been widely used a process which comprises mixing a granular ceramic raw material, a dispersing agent such as water or the like, and an additive such as binder or the like, kneading the resulting ceramic raw material mixture, and extruding the resulting readily formable bullet from the die of an extruder. In particular, a process which comprises feeding a ceramic raw material mixture into a twin screw extruder, conducting therein the transfer and kneading of the mixture simultaneously, and extruding the kneaded material from the die of the extruder, is expected as a process of high productivity.

In such a production process, however, the ceramic raw material mixture having a relatively high viscosity undergoes a large amount of a mechanical energy from the equipment and consequently a large amount of heat is generated in the raw material mixture; as a result, the ceramic raw material mixture hardens owing to, for example, the gelling of the binder, resulting in forced stoppage of the equipment in some cases.

Meanwhile, in JP-B-6-35126 was proposed a production process using a twin screw continuous extruder, wherein a gel type binder having a predetermined viscosity is used and thereby kneading at higher temperatures is made possible.

In this process, however, the pressure generated in a ceramic raw material is not reduced; therefore, the load acting on the extruder is still large, the kneading blade, die, etc. of the extruder tend to undergo wear, damage, etc., and an increase in power consumption is incurred.

Further in this process, extrusion is conducted at a higher viscosity at a higher temperature; therefore, the influence of the above-mentioned heat generation in ceramic raw material is not completely removed.

Meanwhile, in JP-A-05-262558, etc. were proposed processes for production of a ceramic structure, which use a raw material batch obtained by adding, to a ceramic raw material mixture, an organic assistant such as fatty acid ester or the like and thereby enables low-pressure extrusion of readily formable bullet.

In these conventional production processes, however, the pressure reduction effect by the use of the organic assistant such as fatty acid or the like is not sufficient; therefore, the above-mentioned problem is not solved completely, or, even if the pressure reduction effect is sufficient, the density and dispersion of ceramic particles are not sufficient; as a result, there have been problems that the extrudate obtained has low shape retainability and the ceramic structure obtained has defects such as cell breakage, cracking and the like.

Further in the conventional production processes, a relatively long time is required in cutting the extrudate of required external shape (e.g. honeycomb shape) without damaging the shape; thus, there has been a problem also in productivity.

Furthermore in the conventional production processes, there was no systematic index for selection of the organic assistant; therefore, it has been necessary to select an appropriate organic assistant from a substantially limitless number of organic compounds by actually conducting trial productions.

In view of the above problems, the first object of the present invention is to provide a process for production of a ceramic structure, which gives a small load to the production equipment used, which can produce a ceramic structure at high shapability at a high productivity, and which is suitable particularly for production of a honeycomb ceramic structure of small partition wall thickness using a continuous extruder. The second object of the present invention is to provide a process for production of a ceramic structure, which can produce a ceramic structure at high shapability at a high efficiency.

DISCLOSURE OF THE INVENTION

The present inventor made a study in order to achieve the above objects. As a result, the present inventor found out that the first object could be achieved by using a new index, i.e. a haze of a 5 weight % aqueous dispersion or a reduction in peak torque and by selecting an organic assistant having such an index of particular level; and the finding has led to the completion of the present invention. The present inventor also found out that the second object could be achieved by extruding a readily formable bullet at a timing when the torque change (kgf·m/min) per unit kneading time, of a raw material batch becomes nearly 0 (zero); and the finding has led to the completion of the present invention.

According to the present invention, there is provided a process for producing a ceramic structure, which comprises adding an organic assistant to a ceramic raw material mixture, kneading them to obtain a readily formable bullet, and extruding the readily formable bullet to obtain a ceramic structure, wherein the organic assistant is composed mainly of an organic compound giving a haze of 10 to 90% when made into a 5 weight % aqueous dispersion (hereinafter, this process is referred to as "the first production process", in some cases).

In the first production process, there can be mentioned, as the organic compound giving a haze of 10 to 90% when made into a 5 weight % aqueous dispersion, one kind of organic compound selected from an ethylene oxide or propylene oxide adduct of one acid selected from the group consisting of caproic acid, caprylic acid and capric acid, an ethylene oxide-propylene oxide adduct of ethylene glycol or glycerine as a base, an ethylene oxide 6 moles adduct of lauric acid, butanol and valeric acid. Further, the total addition amount of the organic assistant is preferably 0.1 to 10 parts by weight, more preferably 0.5 to 2.0 parts by weight per 100 parts by weight of the ceramic raw material mixture, from the standpoints of pressure reduction effect and prevention of inferior shaping.

In the first production process, it is preferred to further add, to the ceramic raw material mixture, an auxiliary agent composed mainly of at least one kind of fatty acid salt or alkylsulfate salt both having a solubility in 25° C. water, of at least 1 g per 100 g of water. In this case, the fatty acid salt having a solubility in 25° C. water, of at least 1 g per 100 g of water is preferably at least one kind of compound selected from the group consisting of sodium caprate, potassium caprate, magnesium caprate, sodium laurate, potassium laurate and magnesium laurate; and the alkylsulfate salt having a solubility in 25° C. water, of at least 1 g per 100 g of water is preferably sodium laurylsulfate. Further, the total addition amount of the auxiliary agent is preferably 0.1 to 2.0 parts by weight per 100 parts by weight of the ceramic raw material mixture, from the standpoints of pressure reduction effect and prevention of inferior shaping.

Also in the first production process, the ceramic raw material mixture is preferably composed of water, a water-soluble cellulose derivative and a granular ceramic raw material.

Further, the first production process has superior features, for example, the process can effectively reduce the heat incessantly generated in the raw material mixture; therefore, the process can be carried out preferably by feeding, into a continuous extruder, a mixture of the ceramic raw material mixture, the organic assistant and the auxiliary agent added as necessary, conducting transfer and kneading of the mixture simultaneously in the extruder, and extruding the resulting readily formable bullet continuously from the die of the extruder to obtain a ceramic structure.

According to the present invention, there is also provided a process for producing a ceramic structure, which comprises adding an organic assistant and as necessary an auxiliary agent to a ceramic raw material mixture, kneading them to obtain a readily formable bullet, and extruding the readily formable bullet to obtain a ceramic structure, wherein the composition and the addition amount of the organic assistant or the auxiliary agent are selected so that the reduction ($\Delta T$) in peak torque during kneading, represented by the following general formula (1) becomes 20% or more (hereinafter, this process is referred to as "the second production process" in some cases).

$$(\Delta T)=(T^b-T^a)/T^b \times 100 \qquad (1)$$

[In the general formula (1), $T^a$ is a peak torque during kneading when the ceramic raw material mixture, the organic assistant and, as necessary, the auxiliary agent have been used; and $T^b$ is a peak torque during kneading when neither organic assistant nor auxiliary agent has been used and only the ceramic raw material mixture has been used.]

In the second production process, the organic assistant is preferably composed mainly of the above-mentioned organic compound giving a haze of 10 to 90% when made into a 5 weight % aqueous dispersion, and is more preferably used in combination with the above-mentioned auxiliary agent composed mainly of at least one kind of fatty acid salt or alkylsulfate salt both having a solubility in 25° C. water, of at least 1 g per 100 g of water.

According to the present invention, there is also provided a process for producing a ceramic structure, which comprises feeding, into an extruder, a mixture of a ceramic raw material mixture, an organic assistant and an auxiliary agent added as necessary, conducting transfer and kneading of the mixture simultaneously in the extruder to obtain a readily formable bullet, and extruding the readily formable bullet continuously from the die of the extruder to obtain a ceramic structure, wherein the extrusion of the readily formable bullet is made at a timing when the raw material batch gives a torque change per unit kneading time, of 0.02 Kgf·m/min or less (hereinafter, this process is referred to as "the third production process", in some cases).

In the third production process, the organic assistant is preferably composed mainly of the above-mentioned organic compound giving a haze of 10 to 90% when made into a 5 weight % aqueous dispersion, and is more preferably used in combination with the above-mentioned auxiliary agent composed mainly of at least one kind of fatty acid salt or alkylsulfate salt both having a solubility in 25° C. water, of at least 1 g per 100 g of water. Further, it is preferred that the composition and the addition amount of the organic assistant or the auxiliary agent are selected so that the above-mentioned reduction ($\Delta T$) in peak torque during kneading becomes 20% or more.

BEST MODE FOR CARRYING OUT THE INVENTION

1. First Production Process

Figure 1:
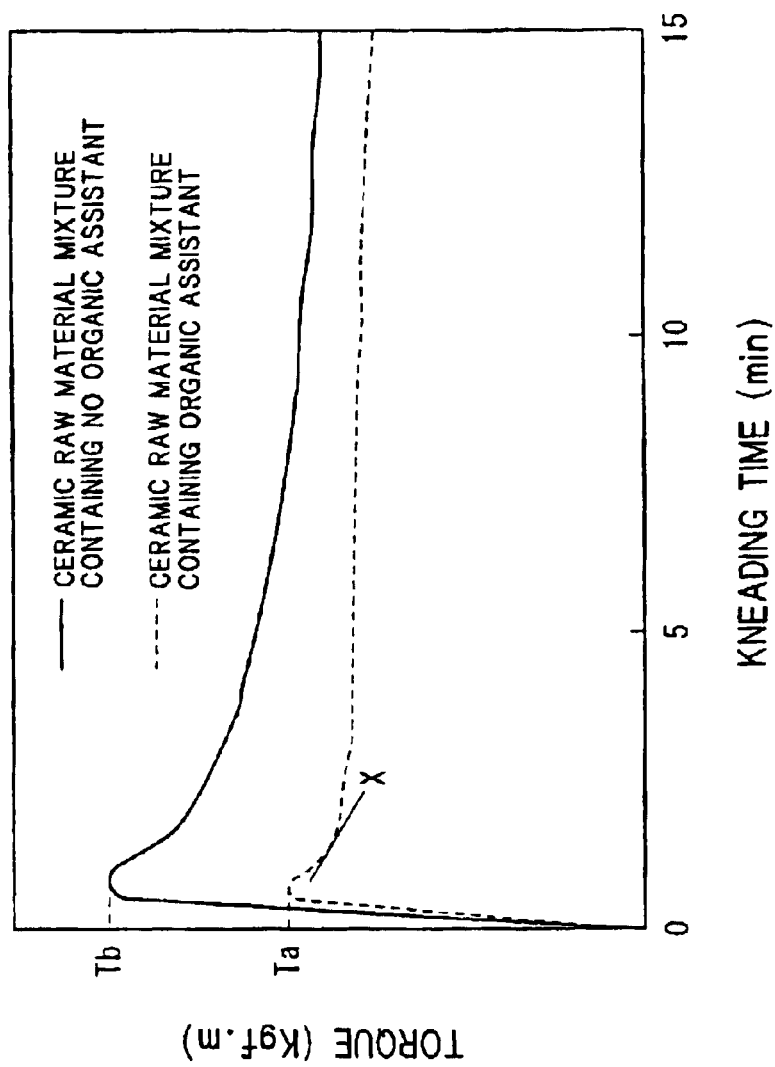
FIG. 1 is a graph showing a relation between the torque acting on kneading blade during kneading and the time of kneading, obtained in one embodiment of the present invention.

The first production process of the present invention comprises adding, to a ceramic raw material mixture (this mixture is hereinafter referred to simply as "raw material mixture", in some cases), an organic assistant composed mainly of an organic compound giving a haze of 10 to 90% when made into a 5 weight % aqueous dispersion, kneading them to obtain a readily formable bullet, and extruding the readily formable bullet to obtain a ceramic structure.

Thereby, it is possible to suppress interactions in individual raw materials, that is, an interaction in each of particulate ceramic raw material, binder and organic assistant) and enhance interactions between different raw materials, that is, interactions between particulate ceramic raw material and organic assistant, between water and binder, between water and particulate ceramic raw material, and between water and organic assistant; as a result, the individual components in the raw material mixture can be made uniform in a shorter time and a shaped material such as honeycomb material or the like, of high shape retainability can be produced even by continuous extrusion.

The above-mentioned interactions in individual raw materials or between different raw materials yield further advantages that the pressure acting on the raw material mixture and the heat generated in the raw material mixture, both appearing during kneading of the raw material mixture are reduced; as a result, the curing of the raw material mixture due to, for example, the gelling of the binder can be prevented and the extrudability of the readily formable bullet can be enhanced, and the load to the equipment can be lowered and the life of the equipment can be extended.

Further in the process, the organic assistant is selected by a simple index of haze; thereby, preferable extrusion conditions can be employed (there is no need of determining the extrusion conditions by conducting actual production) and the cutting of shaped material can be made in a shorter time; as a result, a high productivity is achievable.

In the present invention, the organic assistant added to the raw material mixture is composed of an organic compound giving a haze of 10 to 90%, preferably 50 to 90%, more preferably 70 to 90% when made into a 5 weight % aqueous dispersion.

When the haze of the 5 weight % aqueous dispersion is less than 10%, the organic assistant has too high a solubility in water; therefore, it is impossible to suppress the interaction in particulate ceramic raw material and the above-mentioned effects are not exhibited sufficiently. Meanwhile, when the haze is more than 90%, the organic assistant has too low a solubility in water; therefore, the organic assistant causes self-cohesion and it is impossible to suppress the interaction in raw material powder and the interaction in binder; resultantly, the above-mentioned effects are not exhibited sufficiently.

In the present invention, "haze" refers to a value determined by the following general formula (2) when a light is applied to a liquid dispersion and the resulting transmitted light and scattered light are measured.

$$\text{Haze}=(\text{diffuse transmittance})/(\text{total light transmittance}) \times 100 \qquad (2)$$

[In the above general formula (2), total light transmittance refers to an intensity ratio of transmitted light component and scattered light component to incident light in visible light region; and diffuse transmittance refers to an intensity ratio of scattered light component to incident light in visible light region.]

The organic compound giving a haze of 10 to 90% when made into a 5 weight % aqueous dispersion, generally includes those organic compounds which have both hydrophobic group and hydrophilic group in the molecule, are low in solubility or dispersibility in water, but, when added to water, are not insoluble therein and not completely separated. The organic compound, however, does not includes all organic compounds having both hydrophobic group and hydrophilic group in the molecule. There can be specifically mentioned, for example, an ethylene oxide or propylene oxide adduct of one acid selected from the group consisting of caproic acid, caprylic acid and capric acid, an ethylene oxide-propylene oxide adduct of ethylene glycol or glycerine as a base, an ethylene oxide 6 moles adduct of lauric acid, butanol and valeric acid.

The organic compound used in the present invention can be composed mainly of one or more of the above-mentioned organic compounds. The present organic compound is preferably composed mainly of at least one kind selected from an ethylene oxide 6 moles adduct of lauric acid and an ethylene oxide-propylene oxide adduct of glycerine as a base, because the extrudate obtained has high shape retainability, the extrudability of readily formable bullet is high, and the heat generated in the raw material mixture can be decreased.

Incidentally, a study by the present inventor revealed that an ethylene oxide 4 moles adduct of lauric acid and an ethylene oxide 10 moles adduct of lauric acid, each of which is a compound of the same kind as an ethylene oxide 6 moles adduct of lauric acid, give a haze deviating from the range of 10 to 90% when made into a 5 weight % aqueous dispersion and, when such an organic assistant is used, the effects of the present invention are not obtained.

In the present invention, the addition amount of the organic assistant is preferably 0.1 to 10 parts by weight, more preferably 0.1 to 2.0 parts by weight, particularly preferably 0.5 to 1.0 part by weight per 100 parts by weight of the raw material mixture.

When the addition amount is less than 0.1 part by weight, the uniformization of the raw material mixture, the decreases in the pressure acting on raw material mixture as well as in the heat generated in raw material mixture, etc. may be insufficient. Meanwhile, when the addition amount is more than 10 parts by weight, the organic assistant is separated from the ceramic raw material mixture during kneading, etc.; therefore, the uniformization of the raw material mixture becomes insufficient and there may arise various inconveniences such as deformation of partition wall, etc. of honeycomb material during extrusion, formation of cracks in ceramic structure during drying or firing, and the like.

In the first production process of the present invention, it is preferred to add, to the raw material mixture, not only the above-mentioned organic assistant but also an auxiliary agent composed mainly of at least one kind of fatty acid salt or alkylsulfate salt both having a solubility in 25° C. water, of at least 1 g per 100 g of water.

The addition of the auxiliary agent, as compared with the addition of the organic assistant alone, can uniformize the individual components of the raw material mixture quickly and can produce an extrudate of high shape retainability even when kneading is made in a short time. Further with the addition of the auxiliary agent, since the pressure acting on the raw material mixture and the heat generated in the raw material mixture can be reduced substantially, the curing of the raw material mixture can be prevented almost completely and the load acting on the equipment during kneading can be further reduced. Furthermore, the extrudability of the readily formable bullet and the cuttability of the extrudate can be further enhanced.

Incidentally, with the addition of only the fatty acid salt having a solubility in 25° C. water, of at least 1 g per 100 g of water, the extrudability of the readily formable bullet can be enhanced; however, there are problems in that the extrudate, for example, the honeycomb extrudate is low in shape retainability (for example, the honeycomb extrudate has deformed partition walls owing to the own weight), or the extrudate causes striking shrinkage during the drying or firing and the resulting ceramic structure tends to give rise to cracking, etc.

As the fatty acid salt having a solubility in 25° C. water, of at least 1 g per 100 g of water, there can be mentioned, for example, sodium laurylsulfate, sodium caprate and potassium laurate. Of these, potassium laurate is preferred because, for example, the pressure acting on the raw material mixture is greatly reduced with potassium laurate. As the alkylsulfate salt having a solubility in 25° C. water, of at least 1 g per 100 g of water, sodium laurylsulfate is preferred for the same reason.

The total addition amount of the auxiliary agent is preferably 0.1 to 2.0 parts by weight, more preferably 0.1 to 1.0 part by weight, particularly preferably 0.3 to 0.6 part by weight per 100 parts by weight of the raw material mixture.

When the total addition amount of the auxiliary agent is less than 0.1 part by weight per 100 parts by weight of the raw material mixture, for example, the above-mentioned reduction in the pressure acting on the raw material mixture may be insufficient. When the total addition amount is more than 2.0 parts by weight per 100 parts by weight of the raw material mixture, the shape retainability of the extrudate obtained is low and the resulting ceramic structure may have an inferior shape.

The raw material mixture used in the present invention contains a particulate ceramic material and a dispersing agent such as water or the like. It can further contain additives such as binder and the like.

As the particulate ceramic material, there can be mentioned, for example, those ceramic materials each composed mainly of silicon, titanium, zirconium, silicon carbide, boron carbide, titanium carbide, zirconium carbide, silicon nitride, boron nitride, aluminum nitride, aluminum oxide, zirconium oxide, mullite, raw materials capable of forming cordierite, aluminum titanate, sialon, kaolin, talc, aluminum hydroxide, fused silica or quartz.

As the binder, there can be mentioned, for example, water-soluble cellulose derivatives such as hydroxypropyl methyl cellulose, methyl cellulose, hydroxyethyl cellulose, carboxymethyl cellulose and the like, and polyvinyl alcohol.

Each of the ceramic material and the binder can be used in one kind or in combination of two or more kinds. In the present invention, it is possible to further add, besides them, additives such as hole-making agent for pore formation, and the like.

In the present invention, there is no particular restriction as to the amount of the dispersing agent such as water or the like. However, the dispersing agent is preferably present in the raw material mixture in an amount of 20 to 40% by weight. By using the dispersing agent, good extrudability and good cuttability of extrudate can be obtained while the extrudate obtained by extrusion keeps good shape retainability.

In the present invention, the amount of the dispersing agent (e.g. water) in the raw material mixture can be decreased owing to the above-mentioned actions of the organic assistant and the auxiliary agent; as a result, the extrudate obtained can have higher shape retainability.

In the present invention, kneading and extrusion can be conducted, for example, by conducting kneading using a vacuum pug mill to obtain a cylindrical readily formable bullet and then extruding the readily formable bullet from a ram extruder to obtain a honeycomb-shaped extrudate.

In the present invention, as mentioned previously, the pressure acting on the raw material mixture during the extrusion of the readily formable bullet and the heat generated in the raw material mixture are reduced greatly and, moreover, the individual components in the raw material mixture are uniformized quickly in the kneading. Therefore, the present process for production of ceramic structure can be conducted preferably by feeding, into a continuous extruder of twin screw extruder type or the like, having high requirements for these properties, a mixture of a ceramic raw material, an organic assistant and an auxiliary agent added as necessary, conducting, in the extruder, transfer and kneading simultaneously to obtain a readily formable bullet, and extruding the readily formable bullet continuously from the die of the extruder; thereby, a high productivity is achievable.

In the present invention, there is no particular restriction as to the conditions for drying, firing, etc. of the extrudate obtained by extrusion. The drying, firing, etc. are conducted under the conditions ordinarily employed, whereby a ceramic structure can be obtained.

2. Second Production Process

The second production process of the present invention comprises adding an organic assistant or an auxiliary agent to a raw material mixture, kneading them to obtain a readily formable bullet, and extruding the readily formable bullet to obtain a ceramic structure, wherein the composition and the addition amount of the organic assistant or the auxiliary agent are selected so that the reduction ($\Delta T$) in peak torque during kneading becomes 20% or more.

Thereby, the individual components in the raw material mixture can be uniformized in a short time; as a result, no inferior shaping caused by nonuniform kneading arises even in the case of short time kneading and a ceramic structure of high shapability can be produced.

Further, the pressure acting on the raw materials and the heat generated in the raw materials, both arising during the kneading of raw material mixture can be reduced; as a result, the curing of raw material mixture can be prevented, the extrudability of readily formable bullet is enhanced, and the load to equipment can be reduced.

Furthermore, the organic assistant is selected by a simple index of the reduction in peak torque; thereby, preferable extrusion conditions can be selected easily and reliably (there is no need of determining the extrusion conditions by conducting actual production) and the cutting of shaped material can be made in a shorter time; as a result, a high productivity is achievable.

Herein, the reduction ($\Delta T$) in peak torque, used in the second production process refers to a value represented by the following general formula (1).

$$(\Delta T) = (T^b - T^a)/T^b \times 100 \quad (1)$$

[In the general formula (1), $T^a$ is a peak torque during kneading when the ceramic raw material mixture, the organic assistant and, as necessary, the auxiliary agent have been used; and $T^b$ is a peak torque during kneading when neither organic assistant nor auxiliary agent has been used and only the ceramic raw material mixture has been used.]

The organic assistant used in the second production process is selected so that the reduction ($\Delta T$) in peak torque becomes 20% or more, preferably 30% or more, more preferably 40% or more.

When the reduction ($\Delta T$) in peak torque is less than 20%, the pressure and heat appearing in the raw material mixture are not reduced sufficiently; as a result, the extruder receives a higher load, the kneading blade, die, etc. of the extruder undergo wear, damage, etc., the raw material mixture hardens owing to, for example, the gelling of binder, and the extruder may have to be forcibly stopped. Moreover, since the quick uniformization of the individual components in the raw material mixture is impossible, the resulting nonuniform kneading gives inferior extrusion and accordingly an inferior extrudate.

Further explanation is made on the general formula (1), referring to FIG. 1.

FIG. 1 is a graph showing a change with time, of the torque acting on kneading blade during kneading by extruder, obtained in an embodiment of the first production process. The solid line refers to a torque change when a ceramic raw material containing no organic assistant was used, and the dotted line refers to a torque change when a ceramic raw material containing an organic assistant was used.

As shown in FIG. 1, torque increases at the start of kneading of raw material mixture regardless of the inclusion of organic assistant and reaches its peak in a short time. Thereafter, torque decreases gradually; after a certain period, there is substantially no torque change per unit kneading time (Kgf·m/min) (torque change is indicated by the tangent X in FIG. 1) and this state continues.

When a raw material mixture containing an organic assistant is used, the peak torque (Kgf·m) is extremely small and, after the peak torque has been reached, the torque change per unit kneading time (Kgf·m/min) becomes almost 0 (zero) in a short time. Meanwhile, when a raw material mixture containing no organic assistant is used, the peak torque (Kgf·m) is extremely large and, after the peak torque has been reached, the torque (Kgf·m) decreases slowly and gradually approaches the torque (Kgf·m) of the raw material mixture containing an organic assistant.

In the present invention, peak torque (Kgf·m) was determined for two cases of when a raw material mixture containing an organic assistant and as necessary an auxiliary agent was kneaded and when a raw material mixture containing neither organic assistant nor auxiliary agent was kneaded; and a reduction in peak torque, calculated from the ratio of the above-obtained two peak torques (Kgf·m) was used as an index for determining preferred extrusion conditions. That is, in the present invention, there is determined a relative value regarding the peak torque (Kgf·m) which is seen in the initial stage of kneading of raw material mixture and in which a pressure reduction effect is most striking; based on this simple index, the compositions and amounts of the organic assistant and auxiliary agent used are selected; thereby, a process for production of a ceramic structure, capable of exhibiting the above-mentioned superior properties can be provided simply and reliably.

In the present production process, there is no particular restriction as to the compositions and amounts of the organic assistant and auxiliary agent used, except that they are selected so that the reduction in peak torque becomes 20% or more. However, it is preferred to use the above-mentioned organic assistant giving a haze of 10 to 90% when made into a 5 weight % aqueous dispersion and it is more preferred to use, in combination, such an organic assistant and an auxiliary agent composed mainly of at least the above-mentioned fatty acid salt or alkylsulfate salt giving a solubility in 25° C. water, of at least 1 g per 100 g of water, because such use can enhance shapability, extrudability, cuttability, etc.

Other conditions for raw material mixture, etc. are the same as mentioned in the first production process and therefore are not described here.

3. Third Production Process

The third production process comprises feeding, into an extruder, a mixture of a ceramic raw material mixture, an organic assistant and an auxiliary agent added as necessary, conducting transfer and kneading of the mixture simultaneously in the extruder to obtain a readily formable bullet, and extruding the readily formable bullet continuously from the die of the extruder, wherein the extrusion of the readily formable bullet is made at a timing when the raw material batch gives a torque change per unit kneading time, of 0.02 Kgf·m/min or less, preferably 0.01 Kgf·m/min or less.

Thereby, the extrusion of the readily formable bullet can be made when the individual components in the raw material mixture have become uniform, and a defect-free ceramic structure can be produced efficiently.

As to the kind and amount of the organic assistant used, there is no particular restriction. However, the organic assistant mentioned in the first and second production processes is preferred, and its use in combination with the auxiliary agent mentioned in the first production process is more preferred. Other points are the same as mentioned in the first and second production processes and therefore are not described here.

PRODUCTION EXAMPLES

The present invention is described more specifically below by showing Production Examples. However, the present invention is in no way restricted to these Production Examples.

Production Example 1

First, there were mixed 90 g of a particulate raw material for cordierite formation, constituted by talc, kaolin, alumina, etc., 5 g of hydroxypropyl methyl cellulose as a binder, and 35.1 g (27.0% by weight in ceramic raw material mixture) of water, to obtain a ceramic raw material mixture.

Then, to 100 parts by weight of the ceramic raw material mixture was added 14.1 parts by weight of an ethylene oxide 6 moles adduct of lauric acid, followed by mixing, to obtain a raw material batch.

Thereafter, the raw material batch was fed into a continuous extruder and kneaded therein. The resulting readily formable bullet was continuously extruded from the die of the extruder to obtain a honeycomb shaped material. The honeycomb shaped material was cut so as to have a length of 10.0 cm in the axial direction, by lowering a wire in a direction perpendicular to the axial direction, to obtain a honeycomb shaped material of 90.0 mm in diameter and 100.0 mm in length.

At that time, the organic assistant was selected by determining a haze and a reduction in peak torque during kneading according to the following methods. The kinds, haze, addition amounts and reduction in peak torque, of the organic assistant and auxiliary agent used are shown in Table 1 and Table 2.

(Haze)

An organic assistant shown in Table 1 or 2 was diluted with pure water to a concentration of 5% by weight, and an ultrasonic wave was applied to the mixture to obtain a 5 weight % aqueous dispersion. Using this dispersion, measurement was made in a wavelength range of 350 to 800 nm by using a recording spectrophotometer (UV-3101PC, a product of Shimadzu Corporation) with a halogen lamp used as a light source.

In a sample obtained by dispersing an organic assistant in water, an incident light is scattered into all directions; therefore, the total lights scattered and transmitted in such a sample were gathered by an integrating sphere, their ratio to the incident light was determined at intervals of 2 nm, and the average of these ratios was taken as the total light transmittance of the sample.

Meanwhile, the wall portion of the integrating sphere corresponding to the light path was removed, only the scattered light component was extracted, its intensity ratio to the incident light was measured at intervals of 2 nm, and the average of these ratios was taken as the diffuse transmittance of the sample.

Next, using the above-obtained total light transmittance and diffuse transmittance (a ratio of the averages in a wavelength range of 350 to 800 nm), haze was calculated according to the following general formula (2).

$$\text{Haze}=(\text{diffuse transmittance})/(\text{total light transmittance})\times 100 \quad (2)$$

[In the above general formula (2), total light transmittance refers to an intensity ratio of transmitted light component and scattered light component to incident light in visible light region; and diffuse transmittance refers to an intensity ratio of scattered light component to incident light in visible light region.]

(Reduction in Peak Torque)

The same raw material batch as used in actual production of ceramic structure was fed into a Banbury type kneader and kneaded. The kneader was fitted with a torque meter and the torque generated in kneading was measured with a lapse of time; and there were measured peak torques (Kgf·m) during kneading when a ceramic raw material mixture containing an organic assistant was used and when a ceramic raw material mixture containing no organic assistant was used.

Then, a reduction ($\Delta T$) in peak torque was determined according to the following general formula (1).

$$(\Delta T)=(T^b-T^a)/T^b \times 100 \quad (1)$$

[In the general formula (1), $T^a$ is a peak torque during kneading when the ceramic raw material mixture, the organic assistant and, as necessary, the auxiliary agent have been used; and $T^b$ is a peak torque during kneading when neither organic assistant nor auxiliary agent has been used and only the ceramic raw material mixture has been used.]

Production Examples 2 to 9 and Comparative Examples 1 to 4

Honeycomb shaped materials were obtained in the same manner as in Production Example 1 except that the water amount present in ceramic raw material mixture and the kinds and amounts of organic assistant and auxiliary agent added to ceramic raw material mixture, in Production Example 1 were changed to those shown in Table 1 and Table 2. The kinds, hazes, addition amounts and reductions in peak torque, of the organic assistant and auxiliary agent in each Production Example and each Comparative Example are shown in Table 1 and Table 2.

The water amount in ceramic raw material mixture was various in different ceramic raw material mixtures. The reason is that it was necessary to use a different water content depending upon the kinds of the organic assistant and auxiliary agent used, in order to prevent the deformation of shaped material after extrusion of readily formable bullet, caused by the own weight of the shaped material.

TABLE 1

| | Examples | | | | | Comparative Examples | | | |
|---|---|---|---|---|---|---|---|---|---|
| | 1 | 2 | 3 | 4 | 5 | 1 | 2 | 3 | 4 |
| Name of organic assitant | Ethylene oxide 6 moles adduct of lauric acid | Etylene oxide-propylene oxide adduct of glycerine as a base | Etylene oxide-propylene oxide adduct of glycerine as a base | Valeric acid | Ethylene oxide-propylene oxide adduct of glycerine as a bese of valeric acid | No addition | Etylene oxide 4 moles adduct of lauric acid | Etylene oxide 10 moles adduct of lauric acid | Polyethylene glycol |
| Haze (%) | 14.1 | 89.5 | 89.5 | 80 | 89.5, 80 | — | 97 | 0.9 | 0.1 |
| Addition amount to raw material mixture (part by weight) | 0.5 | 0.5 | 1 | 0.5 | 0.5 ± 0.5 | | 0.5 | 0.5 | 0.5 |
| Reduction in peak torque (%) | 27 | 29 | 33 | 23 | 32 | 0 | 14 | 0.5 | 0.5 |
| Water content in ceramic raw material mixture (wt %) | 31.0 | 30.5 | 30.5 | 31.5 | 30.5 | 32.0 | 31.5 | 32.0 | 32.0 |
| Cuttability | ○ | ○ | ○ | Δ | ○ | X | ○ | Δ | Δ |
| Extrudability | ○ | ○ | ○ | ○ | ○ | X | Δ | Δ | X |

TABLE 2

| | Examples | | | |
|---|---|---|---|---|
| | 6 | 7 | 8 | 9 |
| Name of organic assitant | Ethylene oxide 6 moles adduct of lauric acid | Etylene oxide-propylene oxide adduct of glycerine as a base | Etylene oxide-propylene oxide adduct of glycerine as a base | Valeric acid |
| Haze (%) | 14.1 | 89.5 | 89.5 | 80 |
| Addition amount to raw material mixture (part by weight) | 0.5 | 1.0 | 0.5 | 0.5 |
| Name of auxiliary Agent | Sodium laurylsulfate | Potassium laurate | Sodium laurate | Potassium laurate |
| Addition amount to raw material mixture (part by weight) | 0.6 | 0.45 | 0.6 | 0.3 |
| Water content in ceramic raw material mixture (wt %) | 30.0 | 30.0 | 30.0 | 29.5 |
| Reduction in peak torque (%) | 43 | 52 | 43 | 33 |
| Cuttability | ○ | ○ | ○ | ○ |
| Extrudability | ○ | ○ | ○ | ○ |

(Evaluation)
1. Methods for Evaluation

Evaluation was made for each Example or each Comparative Example according to the following methods.

(1) Extrudability

In each Production Example or each Comparative Example, the extrudability of a readily formable bullet from a continuous extruder to obtain a honeycomb shaped material was evaluated based on the extrusion speed according to the following three levels.

○: Smooth extrusion was possible within 7 seconds at a torque of less than 70% relative to the maximum output of the motor used.

Δ: Extrusion was possible; however, when extrusion was made within 7 seconds, the torque was as high as 70% or more relative to the maximum output of the motor used and was unstable, and the load to the extruder was thought to be large.

X: The torque increased excessively and the extruder had to be stopped.

(2) Cuttability

In the step of cutting a shaped material, of each Example or each Comparative Example, cutting was conducted at various cutting speeds to determine a cutting speed at which no flaw is seen at the cutting surface. Evaluation was made according to the following three levels.

○: The cutting time is within 2 seconds and is shor.
Δ: The cutting time is 2.5 seconds or more and is long.
X: The cutting time is 3 seconds or more and is very long.

2. Results of Evaluation
(1) Production Examples 1 to 5

As shown in Table 1, in each of the production processes of Production Examples 1 to 5 wherein an organic assistant giving a haze of 10 to 90% was added to a ceramic raw material mixture, extrudability was ○ and cuttability was Δ to ○, and both were good. Further, in each production process, the reduction in peak torque, measured beforehand was 23 to 33% and large.

(2) Production Examples 6 to 9

As shown in Table 2, in each of the production processes of Production Examples 6 to 9 wherein to a ceramic raw material mixture were added an organic assistant giving a haze of 10 to 90% and an auxiliary agent composed of a fatty acid salt or alkyl sulfate salt having a solubility in 25° C. water, of at least 1 g per 100 g of water, both extrudability and cuttability were ○ and equivalent to or better than those of Production Examples 1 to 5. Further, in each production process, the reduction in peak torque, measured beforehand was 33 to 52% and larger than those of Production Examples 1 to 5.

(3) Comparative Examples 1 to 4

As shown in Table 1, in Comparative Example 1 wherein no organic assistant was added, both extrudability and cuttability were X.

In the production process of Comparative Example 2 wherein an organic assistant having a large haze of 97% and giving a small reduction in peak torque, of 14% was added, cuttability was ○ but extrudability was Δ.

In each of the production processes of Comparative Examples 3 and 4 wherein an organic assistant having a small haze of 1% or less and giving a small reduction in peak torque, of 1% or less was added, extrudability was Δ to X and cuttability was Δ.

INDUSTRIAL APPLICABILITY

As is clear from the above description, the present invention can provide a process for producing a ceramic structure, wherein the load to extruder is small and the shapability and productivity of ceramic structure are high and which is suitable for production of a honeycomb ceramic structure of small partition wall thickness using a continuous extruder. The present invention can also provide a process for producing a ceramic structure, which can produce a ceramic structure of high shapability efficiently.

What is claimed is:

1. A process for producing a ceramic structure, which comprises adding, to a ceramic raw material mixture, an organic assistant that is one kind of organic compound selected from ethylene oxide or propylene oxide adducts of an acid selected from the group consisting of caproic acid, capyrlic acid, and capric acid, ethylene oxide-propylene oxide adducts of ethylene glycol or glycerine, and an ethylene oxide 6 moles adduct of lauric acid, butanol and valeric acid and gives a haze of 10 to 90% when made into a 5 weight % aqueous dispersion, and an auxiliary agent composed mainly of at least one kind of fatty acid salt or alkylsulfate salt both having a solubility in 25° C. water, of at least 1 g per 100 g of water, kneading them to obtain a readily formable bullet, and extruding the readily formable bullet to obtain a ceramic structure.

2. A process for producing a ceramic structure according to claim 1, wherein the amounts of the organic assistant and the auxiliary agent are selected so that the reduction ($\Delta T$) in peak torque represented by the general formula $$(\Delta T)=(T^b-T^a)/T^b \times 100 \qquad (1)$$

wherein $T^a$ is a peak torque during kneading where the ceramic raw material mixture, organic assistant, and auxiliary agent have been used and $T^b$ is a peak torque during kneading when only the ceramic raw material mixture has been used, is at least 20%.

3. A process for producing a ceramic structure according to claim 1, wherein (1) the ceramic raw material mixture, organic assistant, and auxiliary agent are fed into an extruder, (2) transfer and kneading are carried out simultaneously, (3) the readily formable bullet is extruded continuously from a die of the extruder, and (4) the readily formable bullet is formed at a timing when the raw material batch gives a torque change per unit kneading time of no more than 0.02 Kgf. m/mm.

* * * * *